United States Patent

[11] 3,590,499

[72] Inventor Richard A. Rinehuls
 Park St., Port Crane, N.Y. 13833
[21] Appl. No 823,193
[22] Filed May 8, 1969
[45] Patented July 6, 1971
 Continuation of application Ser. No.
 667,249, Sept. 12, 1967.

[54] DRAFTING INSTRUCTION APPARATUS
 5 Claims, 22 Drawing Figs.
[52] U.S. Cl. .................................................. 35/26,
 35/72
[51] Int. Cl. ............................................ G09b 11/00
[50] Field of Search .......................................... 35/26, 27,
 28, 34, 50, 52, 72, 73; 273/160; 46/24

[56] References Cited
 FOREIGN PATENTS
 292,324 6/1928 Great Britain............

Primary Examiner—Harland S. Skogquist
Attorney—Richard G. Stephens

ABSTRACT: Use in the teaching of mechanical drafting courses, of a coordinated set of blocks each having the same basic overall shape, but with successive blocks provided with successively increasing numbers of surfaces by provision of holes, chamfers and the like to the basic shape, with related surfaces on the various successive blocks having similar identifying indicia, but with the newly added surface on each succeeding block having the same selected identifying indicia.

INVENTOR.
RICHARD A. RINEHULS

BY Richard L. Stephens

ATTORNEY

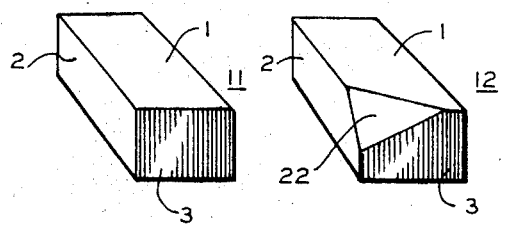
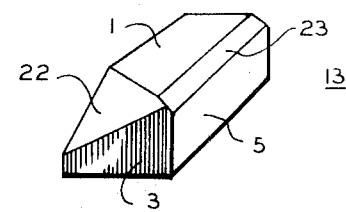
FIG. 1  FIG. 2  FIG. 3
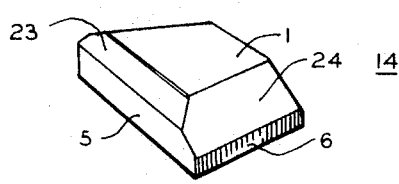
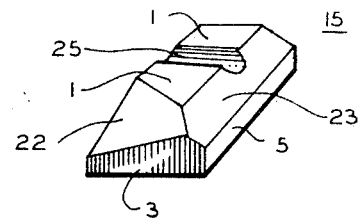
FIG. 4  FIG. 5
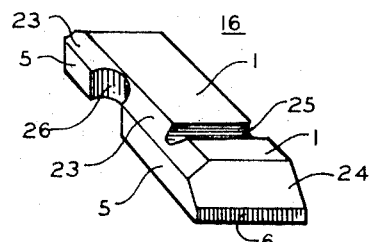
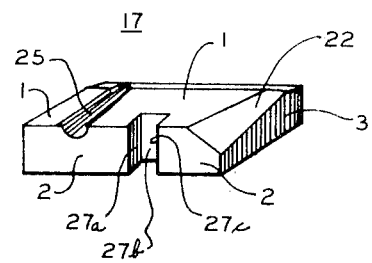
FIG. 6  FIG. 7
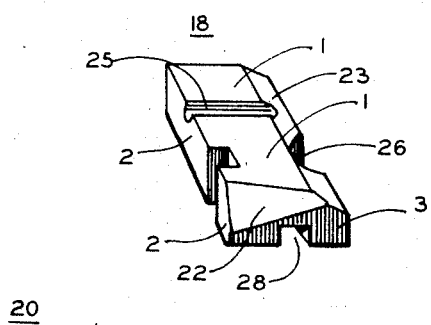
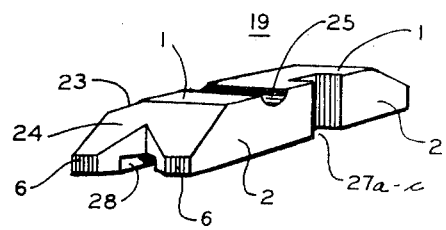
FIG. 8  FIG. 9
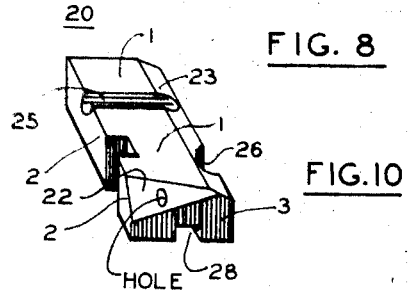
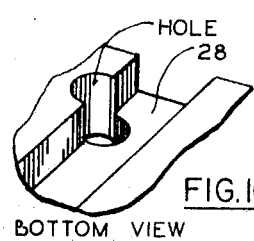
FIG. 10  FIG. 10a  BOTTOM VIEW
*INVENTOR*
RICHARD A. RINEHULS
BY Richard D. Stephens
ATTORNEY

DRAFTING INSTRUCTION APPARATUS

This application is a continuation of application U.S. Ser. No. 667,249 filed Sept. 12, 1967.

It has been common in the teaching of mechanical drafting, to instruct students and to give the students practice, by having students copy previously executed drawings. Often a physical object of the device depicted in the drawings to be copied by the students has been made available to the students, in the hope that they will be able to relate the drawing to the actual physical object. The actual practice of mechanical drafting in industrial applications, however, principally involves a rather reverse process, with the draftsman required to produce drawings when he is provided only with the physical object. Such a method of instruction, which amounts to furnishing the "answer" to the problem presented for solution, does not effectively teach a student to visualize the actual shape of the device depicted by a drawing. An accomplished draftsman must be able both to create original drawings from inspection of a physical object and to be able to read drawings so to visualize the shape of a physical object intended to be depicted by a set of drawings. Use of the present invention allows a student to gain skills in both such processes.

In classroom instruction of a group of students, it has been difficult for an instructor to teach all of the students effectively, partly because the ability to visualize and interpret geometric shapes varies widely between different persons, so that different students progress at widely varying rates of progress. Also, in describing or otherwise referring to a physical object to a group of students in a classroom, much confusion sometimes results over which is the "top," or a "side" or an "end" of an object to be drawn, often seriously diminishing the effectiveness of oral lectures to a group of students. The present invention provides an extremely effective yet inexpensive teaching tool, so that each individual student may be provided with a set of ordered blocks, and each student allowed to progress individually at the maximum rate at which he is capable, and, in fact, the present invention is extremely useful in conjunction with "home study" courses and the like, where written instructions are utilized in lieu of oral lectures. With either type of instruction the sets of blocks of the present invention are highly advantageous, as the use of selected colors on the different surfaces of the blocks eliminates ambiguous instructions, whether they be oral or printed.

While prior drafting instruction methods have presented various simple objects to be drawn to beginning students and various complicated devices to advanced students, it has been extremely difficult when a given student errs on the complex shape for an instructor to determine precisely what concept or technique the student has failed to grasp. The present invention is advantageous in that it presents a series of lessons or problems in a predetermined order, with successive lessons not only involving more advanced and difficult concepts, but with each lesson repeating all of the concepts of previous lessons, so that the precise concept which a student has failed to grasp becomes immediately evident to the instructor, and so that repetition many times of the elementary concepts ingrains them in the student.

Thus it is a primary object of the present invention to provide improved method and apparatus for teaching mechanical drawing or drafting. It is a more specific object of the invention to provide a method for providing instruction in a plurality of ordered steps using a plurality of successive shapes which advance in steps from a simple basic shape to a very complex shape, in which the student is forced to repeat the lessons previously learned as he advances through successive lessons. It is a further object of the invention to provide sets of objects which advance in step-wise fashion from simple shapes to complex shapes with related surfaces of the successive shapes arranged to carry identification indicia in a manner to be described.

Other objects of the invention will in part be obvious and will in part appear hereinafter.

The invention accordingly comprises the features of construction, combinations of elements and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which FIGS. 1 through 10 are isometric views of an exemplary set of ten blocks constructed in accordance with the present invention in a sequence beginning with a simple block in FIG. 1 progressing successively through FIGS. 2 through 9 to a complex final shape in FIG. 10. FIG. 10a is a fragmentary view of a portion of the bottom of block 20 of FIG. 10.

Figure 15:
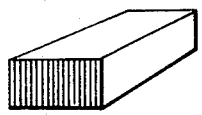
FIGS. 15 through 21 are isometric views illustrating further sets of shapes in accordance with a still further form of the invention.

FIGS. 1 through 10 illustrate in isometric views one form of an ordered set of drafting instruction blocks constructed in accordance with the present invention. FIG. 1 illustrates the first block 11 of the set, which will be used in connection with the first lesson, and block 11 will be seen to comprise a basic rectangular shape, and typically might have dimensions of 6 inches ×3 ×2 inches, for example. Top 1 of block 11 is painted or otherwise provided with a first selected color such as blue, side 2 of block 11 is colored a second color such as red, end 3 of block 11 is colored green, and the remaining three surfaces of the rectangular block (i.e. bottom 4, side 5 and end 6, not visible in FIG. 1) are all white. In a typical drafting course lesson No. 1 will require the student to make three orthogonal views of block 11, and each succeeding lesson will require the student to make three similar orthogonal views of a succeeding one of the blocks of the set.

FIG. 2 illustrates the second block 12 of the set, which has the same basic shape and relative proportions of block 11, and preferably the same size as block 11, except that one corner of block 12 appears to have been ground or sawed off, or otherwise removed, thereby presenting a new or added surface 22 which is provided with a further color such as yellow. Block 12, which is used for the second lesson, will be seen to correspond to block 11 except for the provision of added surface 22.

Block 13, which is used for the third lesson, will be seen in FIG. 3 to have the same basic shape of blocks 11 and 12, but in addition to having been sawed or ground or molded to provide surface 22, block 13 also has been modified by removal of a further portion from the basic shape to provide surface 23, which is now colored yellow, and on block 13, surface 22 is now provided with a different color, such as white. All of the further blocks of the set preferably incorporate the same color change scheme, in which the "new" surface provided on a given block is always the same color (yellow in the examples given), in which sides 1, 2 and 3 (or rather the remaining portions of sides 1, 2 and 3) remain the same colors (blue, red and green, respectively, in the example given) throughout the set, and with "previously new" surfaces reverting to a further color or colors (white in the example given).

Block 14, which is used for lesson No. 4, has one end removed as shown in FIG. 4 to provide a surface 24 colored yellow. Block 15 has a semicylindrical recess provided across the top as shown in FIG. 5 to provide a surface 25 which is colored yellow. Block 16 in FIG. 6 has a vertical semicylindrical recess 26 colored yellow. Block 17 in FIG. 7 is provided with a vertically extending groove, thereby adding surfaces 27a, 27b and 27c to block 17, and all three of these newly added surfaces preferably are painted yellow. Block 18 in FIG. 8 is provided with a longitudinally extending three-sided groove 28, all the sides of which are colored yellow. A V-shaped groove is provided in end 6 of block 19 to add two more surfaces, which are colored yellow. Thus it will be seen that the cuts or removals provided in some blocks add a single new surface, while others add two or more new surfaces. Each "cut" preferably resembles the type of material removal that would be made by a common-type of machine tool, such as a milling machine or drill, for example. An important feature of the invention is the fact that in order to make drawings depicting block 12 of FIG. 2, the student is required to properly locate and at least partially draw for a second time all of the lines of block 11 of FIG. 1, and in order to make drawings of block 13 of FIG. 3, the student is required to properly locate and at least partially draw all of the lines of block 11 for a third time and the added lines of block 12 for a second time, etc., so that each lesson incorporates all of the techniques of prior lessons, and by the time the student has finished lesson No. 10 he will have drawn the block of FIG. 1 ten times, the block of FIG. 2 nine times, the block of FIG. 3 eight times, etc.

It may be noted that various of the successive "cuts" provided in successive blocks affect the outlines of both one or more of the basic or original sides 1—6 of the basic block and some of the previously new surfaces provided on preceding blocks of the set. For example, provision of semicylindrical surface 25 on block 15 requires changes in both top surface 1 and previously added surface 23, and provision of V-shape surface 29 on block 19 in FIG. 9 requires changes when drawing both original end surface 6 and previously added surface 24. Block 20 is shown in FIG. 10 provided with a vertically extending circular hole which intersects surface 22, two surfaces of three sided groove 28 and a portion of bottom 4.

While the blocks have been described as being sawed or ground to provide the added surfaces, such language has been used solely to better describe the relationship of a given block to previous blocks of the set, and the blocks may be molded of plastic, for example, to their desired shapes, without sawing or grinding operations being necessary. And while the various surfaces of the blocks have been described as "colored", and while the use of readily discernible colors, one to a surface, is preferred, it is within the scope of the invention to identify the surfaces of the blocks by other indicia, using plural colors on a single surface, or using lettering or like indicia to identify different surfaces.

Figure 11:
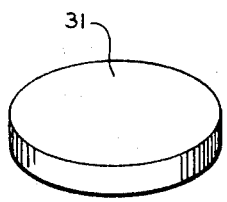
FIG. 11 through 14 illustrate the principles of further sets of blocks comprising alternative forms of the invention.
Figure 12:
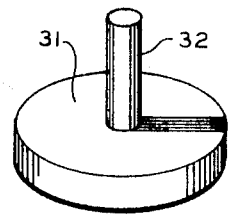
Figure 13:
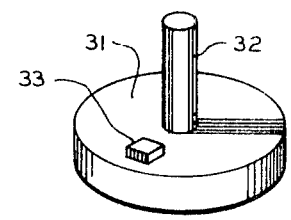

In FIGS. 1 through 10 the successive blocks of the set have been shown as if successive cuts or removals of material had been made to provide additional surfaces. In an alternative form of the invention, additional surfaces are provided on successive blocks in a manner as if material had been added in steps to successive blocks rather than removed therefrom. In FIG. 11 a basic cylindrical shape is provided which has a top 31 colored yellow, a bottom (not visible in FIG. 11) colored green, and a circular edge colored red, for example. The next block of the same set is shown in FIG. 12 provided with a circular shaft 32 colored brown, for example, extending from the basic shape, while a succeeding block shown in FIG. 13 is provided with a pad 33 now colored brown. It will be apparent that a further succession of blocks may be provided similarly adding additional surfaces, as if parts or material were being added onto a basic shape as the student progresses from one block to a succeeding block.

Figure 14:
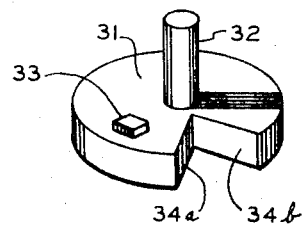

FIG. 14 illustrates a combination of the concepts of FIGS. 1—10 and FIGS. 11—13. Whereas the set of blocks of FIGS. 11—13 progressed as if material were being added to increase the number of surfaces, FIG. 14 illustrates the block of FIG. 13 with a V-groove cut in the basic cut in the basic shape to provide two additional surfaces 34a and 34b and to emphasize that in accordance with the invention, additional surfaces may be provided in successive blocks, with some blocks appearing to have material removed and other blocks appearing to have material added.

Figure 16:
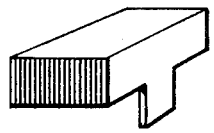
Figure 17:
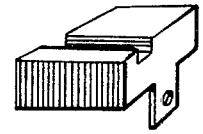
Figure 18:
Figure 19:
Figure 20:
Figure 21:
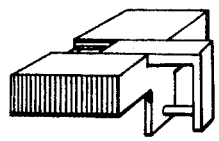

FIGS. 15—21 illustrate a further alternative form of the invention in which learning progresses along two separate paths in two successions of lessons in the manner described above, after which the techniques are combined. FIGS. 15—17 comprise one subset of blocks progressing from the simple block of FIG. 15 to the more complex device of FIG. 17, while FIGS. 18 to 20 comprise a separate set of blocks progressing from the simple shape of FIG. 18 to the more complex shape of FIG. 20. Each such subset in practice may comprise more than three shapes, of course. After the student has mastered the series of lessons pertaining to each subset of shapes, the shapes may be joined or plugged together, as shown in FIG. 21, to provide a relatively complex device to be drawn as the next lesson, and further removals or additions may be made to the assembly of FIG. 21 to provide increasingly difficult tasks. In practicing the form of the invention illustrated in FIGS. 15—21, one subset of shapes will preferably involve practice in one predetermined group of techniques and perhaps involve only straight lines, for example, while the other subset of shapes might principally involve circular or curved lines, for example, and then the complete device of FIG. 21 resulting from combination of the shapes will, or course, involve both groups of techniques. The student will find it much easier to draw the complex combined shape because he has had practice on the two subsets of relatively simple shapes.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

I claim:

1. Mechanical drafting instruction apparatus, comprising, in combination: an ordered set of objects each having a plurality of surfaces with each successive object in the set comprising the same basic shape but having one or more additional surfaces, a plurality of surfaces on successive ones of said objects being provided with different indicia, with related surfaces on successive ones of said objects carrying similar indicia.

2. Mechanical drafting instruction apparatus, comprising, in combination: an ordered set of objects each having a plurality of surfaces with each successive object in the set comprising the same basic shape but having one or more additional surfaces, the additional surface or surfaces provided on each given object of the set which has not or have not been provided on previous objects of the set being provided with the same identification indicia.

3. Apparatus according to claim 1 in which at least one object of the set has a shape which is identical to a previous object of the same set except for an added surface such as would be provided by deleting material from said previous object.

4. Apparatus according to claim 1 in which at least one object of the set has a shape which is identical to a previous object of the same set except for an added surface such as would be provided by adding material to said previous object.

5. Apparatus according to claim 1 having a further set of multisurfaced objects, with each successive object of the further set having a second basic shape and one or more surfaces more than previous objects of the same set, and in which the last objects in each set are adapted to be attached together to provide a further object.